Patented Mar. 9, 1926.

1,576,351

UNITED STATES PATENT OFFICE.

AMOS NEUHAUSER, OF BLUFFTON, INDIANA.

PROCESS OF MAKING CONCENTRATED SOUR MILK.

No Drawing.   Application filed January 19, 1924. Serial No. 687,370.

*To all whom it may concern:*

Be it known that I, AMOS NEUHAUSER, a citizen of United States, residing at Bluffton, in the county of Wells and State of Indiana, have invented new and useful Improvements in Processes of Making Concentrated Sour Milk, of which the following is a specification.

The present invention relates to the production of a cencentrated acidified milk, and has special reference to the production of such a product, from skimmed milk, although it will be understood that, in some cases whole milk, or a mixture of whole milk and skimmed milk, can be used, depending upon the properties desired in the final product. It is not the primary intention to produce a milk powder, or a dried milk, but to produce a substantially fluid mass, for instance a semi-solid or thick paste, or paste-like material. The product is suitable for use in cooking, or is suitable for dilution to produce a material resembling soured skimmed milk or soured milk, by dilution with water, and in addition to being suitable for human consumption, the material can be used as a pig feed or chicken feed or for any other purpose for which it is adapted.

Heretofore attempt has been made to produce dried sour milk, or dried butter-milk, but these attempts have not (so far as I am advised) generally been very successful.

In the preferred form of execution of the process, the skimmed milk, without being subjected to any souring operation, and which in some cases may be entirely free from acidity (or having about the same acidity as freshly drawn milk) is run into a vacuum pan and is concentrated, say 4 to 1, after which a small amount of "starter" is added, and the mass maintained at a temperature of 80 to 110° F., (preferably about 95 to 100° F.) and the acidity allowed to develop to the desired degree, preferably about 3.5% or more, and can be allowed to go up to 5% or even higher in some cases. The semi-liquid mass is then passed under high pressure through a homogenizer, and can if desired be sterilized, and is then ready for packaging and shipping.

The degree of concentration can be varied considerably, but generally, it is preferred to concentrate each 100 gallons of the skim milk, at least down to 35 gallons, and in most cases I would continue this at least down to 30 gallons and I prefer, with skim milk of ordinary quality, to continue the evaporation down to about 25 gallons, (i. e. concentration 4:1).

The acidity can be also developed by adding a small amount of sour milk containing the lactic bacteria, or even can be allowed to take place naturally, at 90–100° F. I prefer to allow the acidity to go up to over 4.5% and preferably up to, or near 5%.

In most cases (and especially if it is desired to produce an entirely homogeneous product), after the souring operation, and before any further treatment of the milk, the same should be passed through a homogenizer, because during the souring, there is always considerable separation or "wheying off" of the milk. It is to be understood that this wheying off is a result of the chemical changes, in which the casein of the milk is, to a substantial extent at least, precipitated by the acidity developed. So far as I am advised, this operation is new in the art, as applied to soured concentrated milk, although in the prior art, the literature abounds in reference to homogenizing milk and various milk products. So far as I am advised, this operation has not previously been applied to concentrated sour milk. Further I call attention to the fact that the product, even before homogenization, is novel.

Particular samples of the product made in accordance with the present invention, were analyzed and found to have the following analysis:

|  | No. 1 | No. 2 |
|---|---|---|
|  | Per cent | Per cent |
| Milk sugar | 12.64 |  |
| Ash | 2.31 |  |
| Fat | .41 |  |
| Acid | 5 | 4.95 |
| Total solids | 31.75 | 31.9 |
| Protein | 11.39 |  |

Products made in accordance with the present invention are found to be most suitable and most stable, when within the following analysis:

Milk sugar 10 to 14%, total solids 29 to 33%, acids 3 to 5.5%, protein 10 to 12%.

The product of the present process can be put up into ordinary wooden barrels, or can be put up in sealed tin cans etc.

It will be understood that the product of the present application can be kept for a considerable time, after opening the package. Thus, for instance, a wooden barrel of the material, after being opened was allowed to stand at atmospheric temperature for about two months.

At the end of this time, it was found that there was a very thin coating of dark colored moldy material on the surface, and this coating was scraped off, and the material below the same was found not to be substantially injured, and in fact it was of sufficient quality to be used in the making of food product for human consumption.

It will be understood that when the product is to be used for human consumption, the entire treatment should be conducted in a perfectly clean and sanitary manner, which is not so necessary when the product is to be fed to pigs or chickens.

I have above particularly referrel to the use of skimmed milk, but it will be understood that the process is to some extent also applicable in the treatment of whole milk, or mixtures of whole milk and skimmed milk, or partially skimmed milk.

Heretofore before concentrating any milk containing over 0.15 of acidity; it was believed necessary to first neutralize with lime or other alkali, which produced a very undesirable flavor and color. The flavor of my product is pure sour milk taste, entirely free from "lime" taste, and the product (especially when made from clean skimmed milk) is pure white.

I claim:

1. A process which comprises concentrating milk at least to 3 to 1 and souring the product to not substantially below 3.5% acidity and homogenizing the product.

2. A process which comprises concentrating skim milk to about 4 to 1 concentration, souring the product at about 90 to 100° F., up to an acidity of over 4% and then homogenizing the product.

3. In the production of edible products from milk, the step of fermenting a concentrated milk product to an acidity of at least about 4% of lactic acid.

In testimony whereof I affix my signature.

AMOS NEUHAUSER.